(12) United States Patent
Banton et al.

(10) Patent No.: US 8,159,713 B2
(45) Date of Patent: Apr. 17, 2012

(54) DATA BINDING IN MULTIPLE MARKING ENGINE PRINTING SYSTEMS

(75) Inventors: Martin E. Banton, Fairport, NY (US); Mark S. Jackson, Rochester, NY (US); Norman W. Zeck, Webster, NY (US); Peter A. Crean, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1364 days.

(21) Appl. No.: 11/636,901

(22) Filed: Dec. 11, 2006

(65) Prior Publication Data

US 2008/0137111 A1    Jun. 12, 2008

(51) Int. Cl.
G06K 15/22    (2006.01)
(52) U.S. Cl. .......... 358/1.4; 358/1.9; 358/3.06; 358/518
(58) Field of Classification Search ........ 358/1.16–1.18, 358/504, 505
See application file for complete search history.

(56) References Cited

U.S. PATENT DOCUMENTS

| | | |
|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,008,713 A | 4/1991 | Ozawa et al. |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,710,968 A | 1/1998 | Clark et al. |
| 5,778,377 A | 7/1998 | Marlin et al. |
| 5,884,910 A | 3/1999 | Mandel |
| 5,933,680 A * | 8/1999 | Nishimura ............ 399/49 |
| 5,995,721 A | 11/1999 | Rourke et al. |
| 6,059,284 A | 5/2000 | Wolf et al. |
| 6,125,248 A | 9/2000 | Moser |
| 6,241,242 B1 | 6/2001 | Munro |
| 6,297,886 B1 | 10/2001 | Cornell |
| 6,337,958 B1 * | 1/2002 | Stanich et al. ............ 399/49 |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Chan S Park
(74) *Attorney, Agent, or Firm* — Fay Sharpe LLP

(57) ABSTRACT

A printing system capable of binding a modified image data to an individual print engine in a multiple print engine system. The system includes an image processor such as a digital front end, a set of transformations, and a configuration of printers. The system can also include a scanner that scans a test image so that this image binding process can be repeated. Furthermore, the transformation binding can also take place in real time.

9 Claims, 6 Drawing Sheets

U.S. PATENT DOCUMENTS

| | | | |
|---|---|---|---|
| 6,341,773 B1 | 1/2002 | Aprato et al. | |
| 6,384,918 B1 | 5/2002 | Hubble, III et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,760,533 B2 * | 7/2004 | Nakamura et al. | 385/141 |
| 6,819,906 B1 | 11/2004 | Herrmann et al. | |
| 6,925,283 B1 | 8/2005 | Mandel et al. | |
| 6,959,165 B2 | 10/2005 | Mandel et al. | |
| 6,973,286 B2 | 12/2005 | Mandel et al. | |
| 7,024,152 B2 | 4/2006 | Lofthus et al. | |
| 7,123,873 B2 | 10/2006 | deJong et al. | |
| 2002/0078012 A1 | 6/2002 | Ryan et al. | |
| 2002/0103559 A1 | 8/2002 | Gartstein | |
| 2003/0077095 A1 | 4/2003 | Conrow | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0130739 A1 * | 7/2004 | Adam et al. | 358/1.9 |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 | 12/2004 | Lofthus et al. | |
| 2005/0018256 A1 * | 1/2005 | Corbin et al. | 358/501 |
| 2005/0134624 A1 * | 6/2005 | Mizes | 347/19 |
| 2006/0033771 A1 | 2/2006 | Lofthus et al. | |
| 2006/0066885 A1 | 3/2006 | Anderson et al. | |
| 2006/0067756 A1 | 3/2006 | Anderson et al. | |
| 2006/0067757 A1 | 3/2006 | Anderson et al. | |
| 2006/0114313 A1 | 6/2006 | Moore | |
| 2006/0114497 A1 | 6/2006 | Anderson et al. | |
| 2006/0115284 A1 | 6/2006 | Grace et al. | |
| 2006/0115287 A1 | 6/2006 | Roof | |
| 2006/0115288 A1 | 6/2006 | Roof | |
| 2006/0132815 A1 | 6/2006 | Lofthus et al. | |
| 2006/0176336 A1 | 8/2006 | Moore et al. | |
| 2006/0197966 A1 | 9/2006 | Viturro et al. | |
| 2006/0209101 A1 | 9/2006 | Mizes | |
| 2006/0214359 A1 | 9/2006 | Clark | |
| 2006/0214364 A1 | 9/2006 | Clark et al. | |
| 2006/0215240 A1 | 9/2006 | Mongeon | |
| 2006/0221159 A1 | 10/2006 | Moore et al. | |
| 2006/0221362 A1 | 10/2006 | Julien et al. | |
| 2006/0222378 A1 | 10/2006 | Julien | |
| 2006/0222384 A1 | 10/2006 | Moore et al. | |
| 2006/0222393 A1 | 10/2006 | de Jong et al. | |
| 2006/0227350 A1 | 10/2006 | Crawford et al. | |
| 2006/0230201 A1 | 10/2006 | Fromherz et al. | |
| 2006/0230403 A1 | 10/2006 | Crawford et al. | |
| 2006/0233569 A1 | 10/2006 | Furst et al. | |
| 2006/0235547 A1 | 10/2006 | Hindi et al. | |
| 2006/0238778 A1 | 10/2006 | Mongeon et al. | |
| 2006/0244980 A1 | 11/2006 | Grace | |
| 2006/0250636 A1 | 11/2006 | Richards | |
| 2007/0024657 A1 * | 2/2007 | Zhang et al. | 347/19 |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/136,959, filed May 25, 2005, German et al.
U.S. Appl. No. 11/137,634, filed May 25, 2005, Lofthus et al.
U.S. Appl. No. 11/137,251, filed May 25, 2005, Lofthus et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalai et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/247,778, filed Oct. 11, 2005, Radulski et al.
U.S. Appl. No. 11/248,044, Oct. 12, 2005, Spencer et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378;046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, filed Sep. 27, 2006, Degruchy.
U.S. Appl. No. 11/545,176, filed Oct. 10, 2006, deJong et al.

* cited by examiner

DATA BINDING IN MULTIPLE MARKING ENGINE PRINTING SYSTEMS

CROSS REFERENCE TO RELATED PATENTS AND APPLICATIONS

The following applications, the disclosures of each being totally incorporated herein by reference as mentioned:

application Ser. No. 11/212,367, filed Aug. 26, 2005, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/274,638, filed Nov. 15, 2005, entitled "GAMUT SELECTION IN MULTI-ENGINE SYSTEMS," by Wencheng Wu, et al.; and U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen.

BACKGROUND

The following relates to the printing and marking arts. It finds particular application in conjunction with quality control of printing systems with multiple marking engines (ME), and will be described with particular reference thereto. However, it should be appreciated that some embodiments are amenable to other applications.

Conventional printing systems can include multiple printers, multiple media paths, and one or multiple destinations. A single scheduler can link two or more of the multiple printers. However, in many instances if one digital front end (DFE) sends the same cyan, magenta, yellow, black (CMYK) values to each of a plurality of the multiple printers, even to printers of the same class, for example N printers of the same model number, e.g., Xerox 7750's, substantially identical color will not be achieved by the plurality of the multiple printers. These differences are due to a difference in typical color value achieved, non-uniformities in the individual engines, and other factors. There are various reasons for the non-uniformities. For example, the printers may have differences in absolute maximum densities or there may be differences in the inboard-to-outboard behavior of the machines. The printers may have scratches on the photoreceptors, or aged parts that cause variations. These problems may lead to a presence of streaks, differences in density achieved along the in-board to outboard direction of the print engines and other non-uniformities. Despite this, image uniformity is a desired goal, and it is highly desirable for the final images to be uniform regardless of the printer used to process any individual page of the print job. And, any given printer may or may not be available when the job or any portion of the job is actually printed.

In view of the above, there is a need in the industry to deliver prints that are substantially identical, regardless of the printers used to process the print job. In addition, there is a need for a system that can interact with a scheduler that has the freedom to assign any given page of a job to any appropriate printer within the printing system. Further, there is a need in the industry for a system that is capable of interacting with a DFE that does not have to know which printer will be processing, at any given time, any given page of the job. Moreover, there is a need in the industry for a system and method that will provide improved compensation of image imperfections.

BRIEF DESCRIPTION

Aspects of the present disclosure and embodiments thereof include apparatus and method embodiments. The method may include producing generic image data that is suitable for processing by the plurality of marking engines. Also, the method includes applying at least one transformation to the generic image data so that when printed on the particular print engine, said transformation converts said generic image data to modified data that conforms to a typical color and page uniformity specification for the plurality of marking engines. The method further includes binding the image in real time to one of the plurality of printers while the image is being printed. The method further includes producing a generic print file image from the DFE. The method includes binding the same page of information to different printers during the course of printing a multiset job.

The method may also include generic image data that is suitable for processing by one particular class of the plurality of marking engines.

The method further includes monitoring the printing process while a job is being printed and generating and applying an updated transformation to the generic image file.

The method further includes measuring a test pattern using a sensor within the confines within the marking engine system.

The method further includes measuring a test pattern using an external scanner.

The method may further include generating rendering tags.

The apparatus may include a plurality of marking engines developed for parallel print processing of a print job or jobs, an image processor that converts input data to generic image data for processing by any of the plurality of marking engines, and a storage component for storing a set of transformations used to convert said generic image data to modified data wherein said modified data when printed on the marking engine for which it has been transformed results in a print that conforms to predetermined specification requirements of typical color and page uniformity for the plurality of marking engines;

The system further includes a system controller.

The system may further include rendering tags generated by the system controller or the image processor or the printer controller.

The system may further include an external scanner that generates processed correction information and sends the processed information to the controller.

The system may further include an external scanner that sends raw data to the controller.

The system may further include a controller that transforms a CYMK value for a first class of marking engine to a CYMK value for a second class of marking engine.

The system may further include a first memory that stores the print image file that is produced by the digital front end and a second memory configured to store a compressed image data file.

The system may further include a decompressor configured to decompress image data.

The system may further include a digital front end that generates rendering tags.

Finally, the system may also include a sensor within the confines of the configuration of marking engines. Further scope of the applicability of the present disclosure will become apparent from the detailed description provided below. It should be understood however, that the detailed description and specific examples, while indicating some embodiments of the disclosure are given by way of illustration only. Various changes and modifications within the spirit and the scope of the disclosure will become apparent to those skilled in the art. For example, all the methods and techniques disclosed apply equally well to adjusting and maintaining the quality of the output from a single printer.

DETAILED DESCRIPTION

Figure 1:
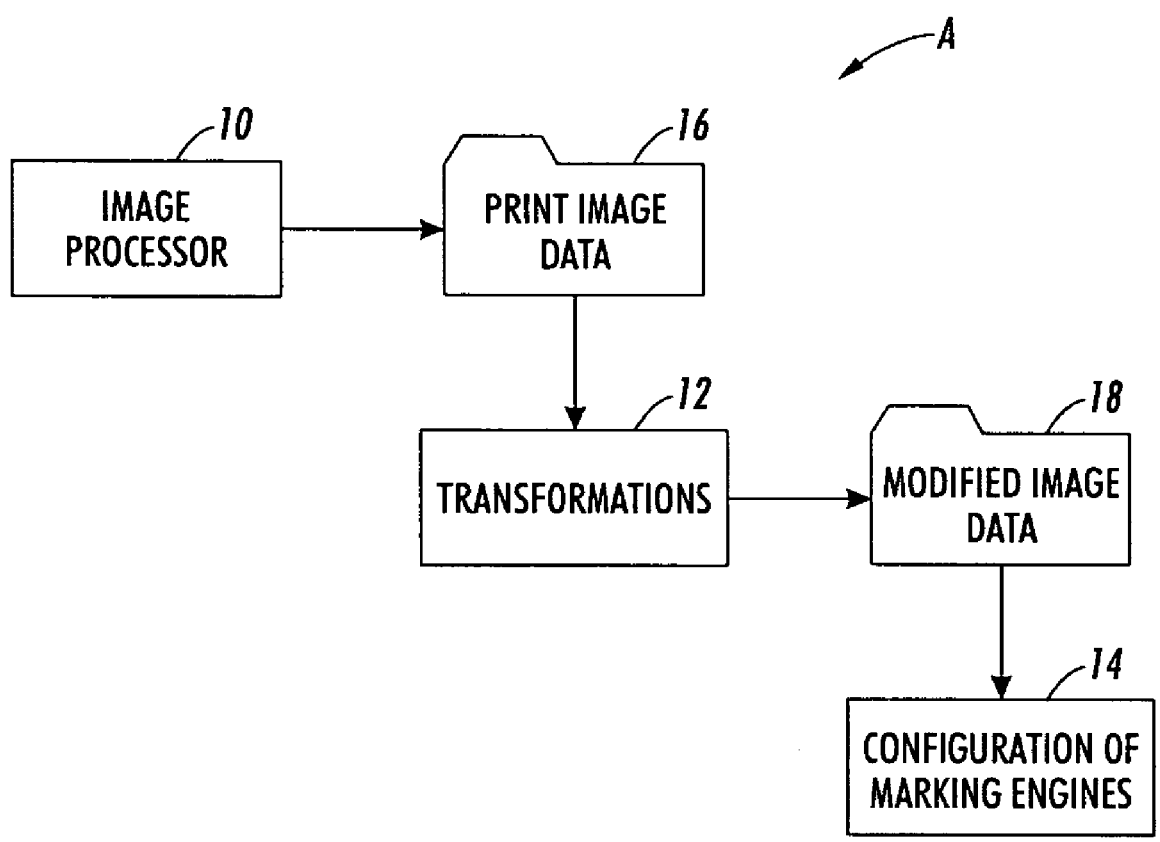
FIG. 1 is a diagrammatic illustration of an example printing system.

With reference to FIG. 1, a portion of a printing system infrastructure A is illustrated. The printing system infrastructure A includes an image processor 10, one or more transformations 12, and marking engines 14. The image processor 10 can include a variety of devices such as a digital front end (DFE), one or more raster image processor(s) (RIP(s)), etc. The image processor is used to convert data to a suitable format, such as 16, that can be processed by the system. For example, the image processor can convert PostScript® file to a CMYK file 16. The one or more transformations 12 are used to convert the file 16 to modified data 18 that satisfies one or more color specifications of one or more of marking engines 14. This is done so that such marking engines 14 produce substantially similar colors to within a predetermined tolerance and within a predetermined page uniformity metric. Satisfying the color tolerance and the page uniformity metric also facilitates providing customers with a final product that appears to have been produced using only one marking engine.

Figure 2:
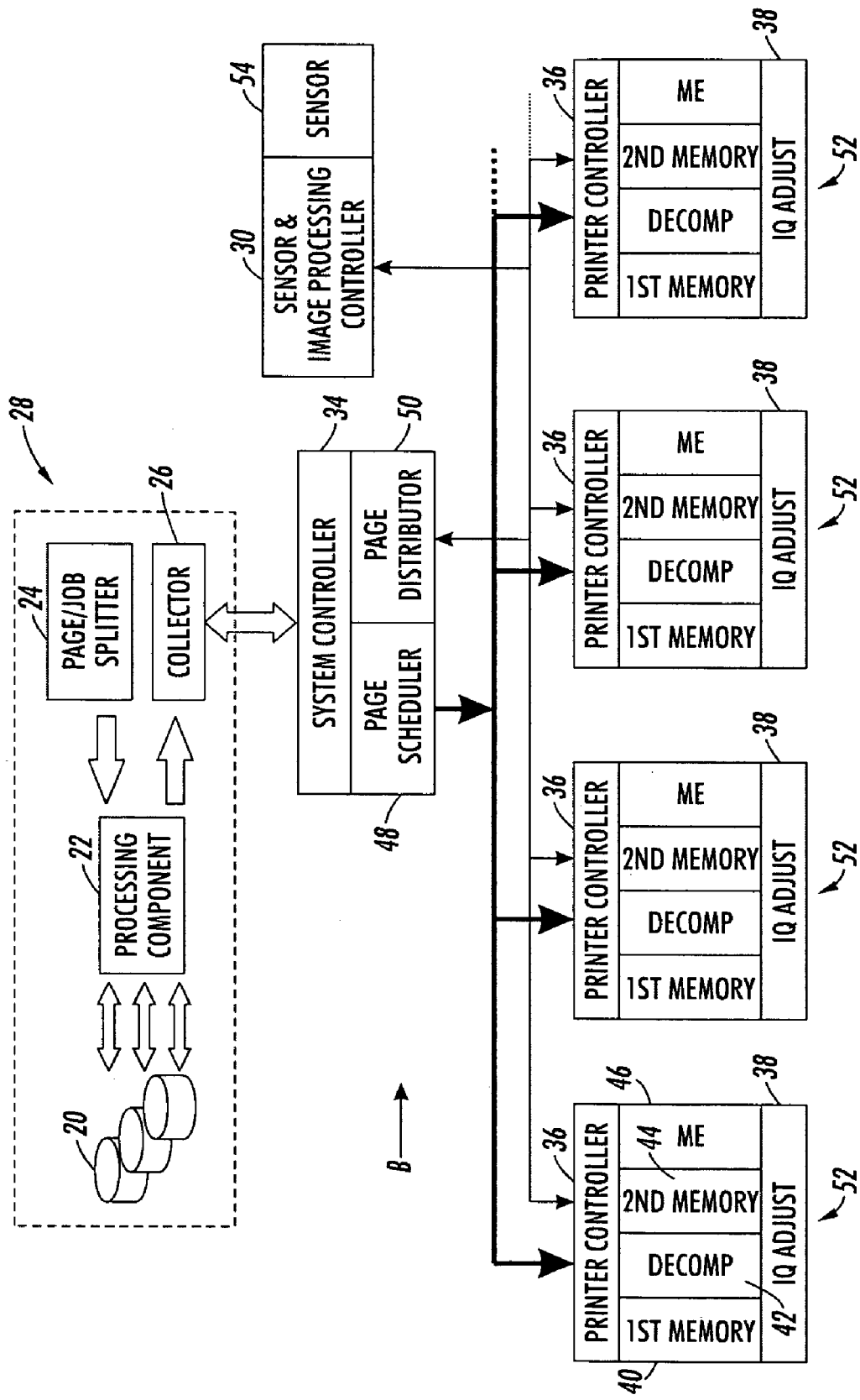
FIG. 2 is a diagrammatic illustration of the example printing system of FIG. 1 with system control aspects diagrammatically expanded.

Referring now to FIG. 2, a more detailed description of printer system A is shown. A digital front end (DFE) 28 includes at least one or more storage units 20, a data processor 22, a splitter 24, and/or a collector 26. In other instances, the DFE 20 may also include and/or be associated with memory (not shown), an archiver (not shown), and/or a recovery mechanism (not shown). Functionality provided by the DFE 28 includes, but is not limited to, automatic picture replacement or open prepress interface, the ability to swap low resolution image data used in file creation with higher resolution images, connectivity, the rendering of jobs from formats such as PostScript to image data that is suitable for use by at least one of the plurality of marking engines, the ability to translate to other popular languages, file formats and parallel processing which allows operators to parcel big jobs between a plurality of processors and process multiple jobs at one time, etc.

The one or more storage units 20 are used to store jobs to be processed by the system A. As such, the one or more storage units 20 may include hard disks, portable memory, physical media (e.g., CD, DVD, etc.), etc. The jobs stored within the one or more storage units 20 are conveyed to the data processor 22, which provides data processing such as color conversion, data compression, etc. For example, the data processor 22 can use various compression techniques to generate smaller CMYK files. The conversion techniques can be used to convert the uncompressed and/or compressed data to other suitable formats. For example the processing component 22 can include one or more raster image processors (RIPs). In one instance, the output data is suitable for one or more particular classes of marking engines. For instance, the output data can be formatted to a continuous tone (contone) based format that is amenable to being transformed in a manner that leads to high image quality (IQ) and/or acceptable image quality consistency (IQC) amongst the print engines being used to print the job. The splitter 24 receives jobs and divides each job into its constituent component for distribution through the system. The collector 26 assembles the divided jobs while maintaining them in their current groupings.

The DFE 28 provides the compressed, converted, etc, jobs to a system controller 34. In one instance, the DFE 28 can provide these is the form of output print image files that are suitable for a given class of marking engine, in a format that is amenable to being transformed in a manner that leads to both high IQ and high IQC. However, the DFE 28 may also provide the job to a system controller in a format that is suitable for every marking engine in the system, regardless of the marking engine's class.

The system controller 34 is capable of receiving data from a sensor and image processing controller 30. In one embodiment, the system controller 34 receives data in the form of corrections to be applied to the data and/or a state of the printers used to process the data. In another embodiment, the system controller 34 uses the printer state information to generate the corrections. In another form, the system controller 34 sends the image data and/or correction instructions to the appropriate printer controllers 36, which are described in further detail below.

A scheduler 48 is configured to schedule the job(s) that will be processed by the system A. The page scheduler 48 schedules the print jobs based on a utility function of the system A that takes advantage of the parallel sheet processing capabilities of the printer system A, while a page distributor 50 delivers the jobs to the appropriate printer module(s) 52.

The system controller 34, in one embodiment, contains within it storage (not shown) for receiving image data for the DFE 28 as well as a decompressor (not shown) for decompressing the image data. Additionally or alternatively, as shown in FIG. 2, a first and a second memory 40, 44 a decompessor 42 can also be included within the printer module(s) 52. In yet another embodiment, the first and second memory 40, 44 and the decompressor 42 are stored externally, outside of the printer system A. By using these components in order to compress the image data, the bandwidth necessary in order to transmit to the system controller 34 is greatly reduced.

In one embodiment the printer controller 36, the first and second memory 40, 44 the decompressor 42, an IQ adjust 38 and a marking engine 46 make up the printer module 52. However, it should be understood that a printer module 52 may be comprised of a variety of components. In the exemplary embodiment, the printer controller 36 receives the print image file and saves it in the first memory 40. The decompressor 42 then decompresses the print image data which in turn is stored in the second memory 44. The IQ adjust 52 then receives the print image data and modifies the print image data into modified image data. This process is discussed in further detail in FIG. 6.

Once the modified image data has been modified to meet the specifications (for example color, grayscale, uniformity, etc.), the marking engine(s) 46 produce an image that has a color that is within the required specification. Furthermore, the ME 46 produces a page that is within the page uniformity specification. Meeting both the color and within page uniformity are necessary for a customer to accept the output from the many MEs 46 as if it were from only one ME.

Continuously, periodically and/or on-demand, the ME 46 produces a test procedure with a test pattern. The frequency of tests can vary according to the user's specifications. A sensor 54 in turn uses the test pattern in order to assess the performance and or quality of the marking engine(s) 46 output image. In one instance, the sensor 54 is a full width array (FWA) image sensor that is made of several silicon sensor chips mounted together from end to end with high precision, forming a seamless array of photosites over the length of the array. In another instance, the sensor is a two dimensional array. However, the two-dimensional sensor 54 is but one embodiment for this disclosure, other complementary metal oxide semiconductor (CMOS) scanners could be used. Furthermore, traditional charged couple device (CCD) scanners could be used as well as any other sensor known in the art. Furthermore the sensor may be any scanner located within the physical confines of the system or out the physical confines of the system.

The sensor 54 scans a test pattern(s) in order to test if the test pattern(s) meets the page uniformity and color specification requirements. The results of the tests are then communicated through the sensor 54 and to the image processing controller 34. In one embodiment, the sensor and image processing controller 30 in turn communicate the data to the printer controller 36. In which case, if the test pattern did not meet the page uniformity and color specification requirements, then the printer controller would then communicate to the IQ adjust 38 that it needs to apply another set of transformations to the image data in order that the page uniformity and color specification requirements are met. In another embodiment, the sensor controller 30 may communicate the results to the system controller 34. In this instance, the system controller may reschedule the job and/or pages to different printer modules 36 based at least in part upon the test results.

Figure 3:
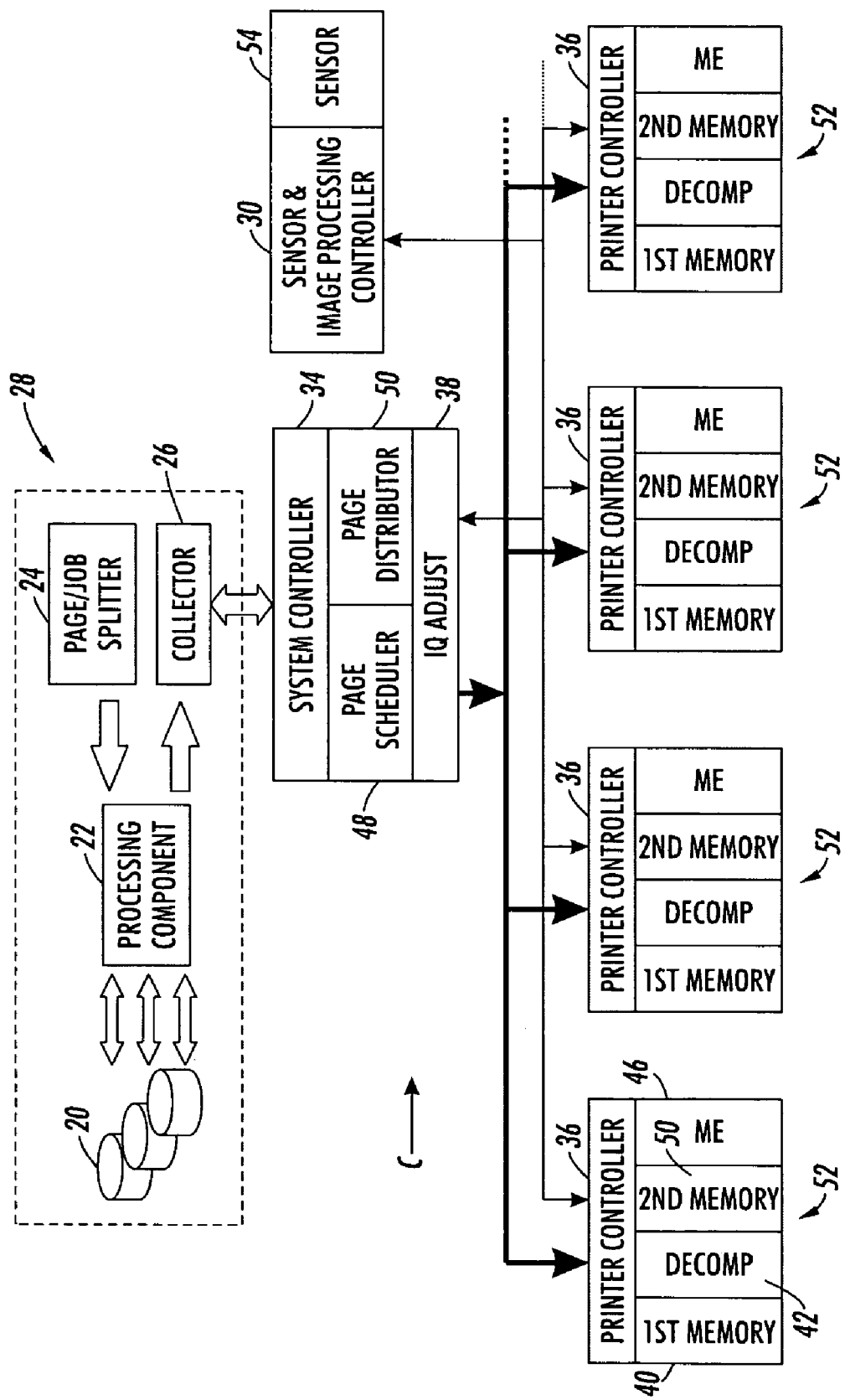
FIG. 3 is a diagrammatic illustration of another embodiment of FIG. 1 with system control aspects diagrammatically expanded.

Referring now to FIG. 3, in this embodiment the IQ adjust 38 is contained within the system controller 34. In this embodiment, the transformations to the image data are applied before the system controller 34 sends the image data to the individual printer modules 52. Although FIGS. 2 and 3 disclose two exemplary systems, it should be recognized that these are not the only two embodiments of the system. The IQ adjust 38 could be housed in a variety of different places. For example, the DFE 28 could house an IQ adjust 38 or the IQ adjust 38 could be housed in some external device.

Still referring to FIG. 3, with the IQ adjust 38 stored in the system controller 34, the system controller 34 has a variety of options in which to send the modified image data. For example, the modified image data could be sent to the appropriate printer module in which scheduling can be optimized. By way of example, the system controller 34 could provide statistical information about coverage for all of the jobs in its queue and send the appropriate jobs, with transformations already in place, to the appropriate printer modules. In this embodiment, the system controller 34 can also send specific jobs to marking engine 46 with specific IQ adjust 38 characteristics. For example, the system controller 34 can calculate which of the marking engines 46 are in better position to make certain adjustments and direct the specific job to that printer module 52. This can aid in assuring that the marking engines 46 age at approximately the same rate, effectively increasing system reliability.

Figure 4:
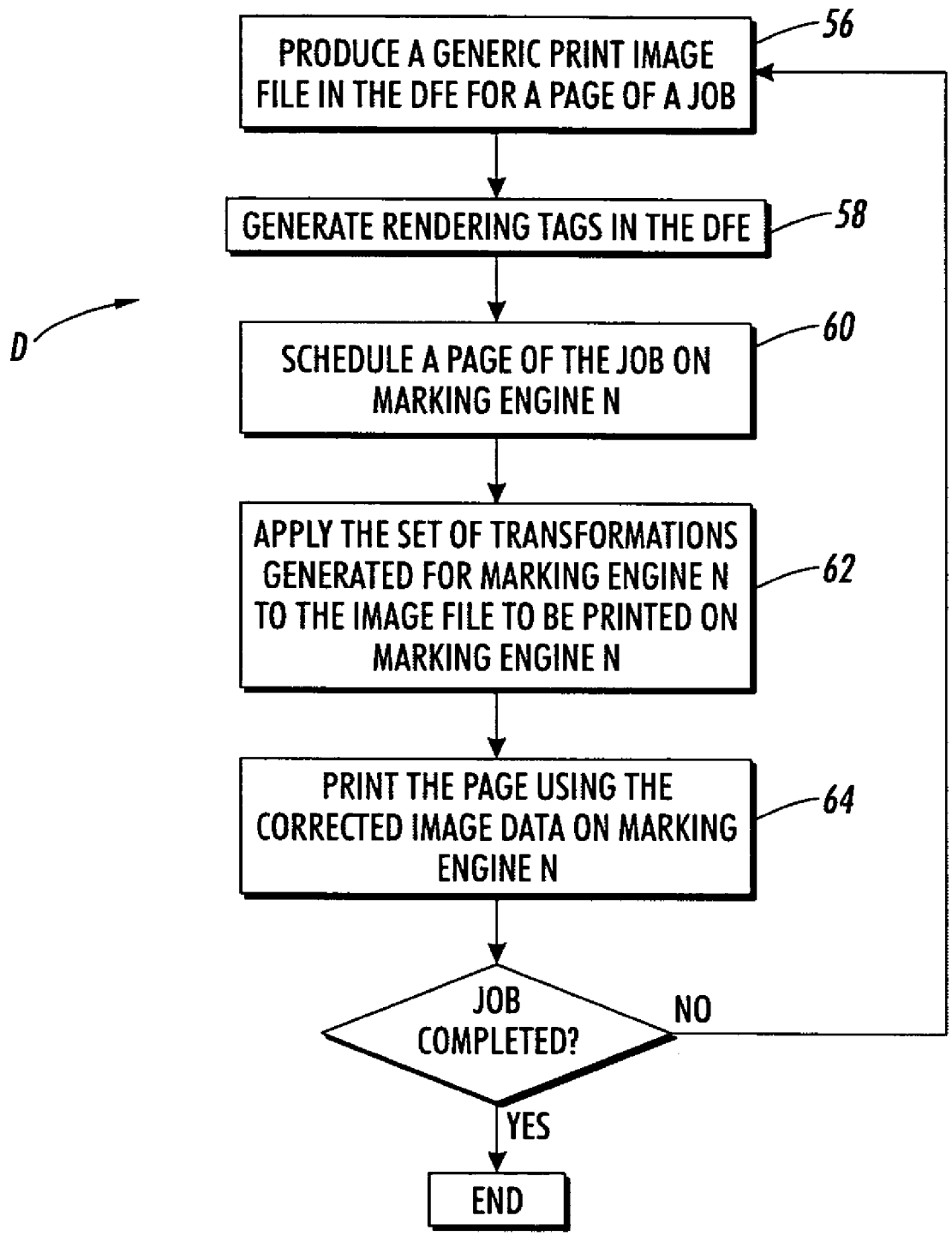
FIG. 4 flow chart illustrating a method according to present disclosure.

Referring now to FIG. 4, a method for late-binding image data to an individual marking engine and printing systems with multiple marking engines is shown generally (at D). It should be understood that the method D may be implemented using a variety of software and hardware configurations.

The method D includes producing a generic print image data at the digital front end (at 56). Rendering or pixel identification tags may also be produced at the digital front end. In one embodiment, this generic print image data is compressed thereby allowing for a decreased amount of bandwidth requirement. In another embodiment, the print image data is a generic print image data. In this respect, the DFE is not delivering the exact image to be printed on any one marking engine of a class, however, it is configured to deliver an image that may be printed on more than one marking engine of a class of marking engines, e.g., several color xerographic printers that are nominally the same where nominally the same means that they have the same specified printing characteristics but will not produce identical colors when given the same input image data. Generating acceptable output prints when using more than one marking engine is achieved by the DFE emitting a generic image that is transformed in real time to match whichever of the marking engines ends up printing any given page. This embodiment describes such an image path. Note that when multiple copies of a job are printed, page 3, for example, may be printed on different marking engines depending on the number of the copy set.

The DFE will emit different CMYK for engines of different classes so that the choice of engine class is made early when the job is being RiPped. Often the printing system will consist of multiple engines of just one engine class. In one embodiment, CMYK values are transformed for one class of marking engine so that it is suitable for a different class of marking engine. In one embodiment, this transformation is located in the printer module. In another embodiment this transformation is located in a controller. It should be noted that the quality of the transformed CMYK sent to one class marking engine may be lower than if it was RiPped for a different class. For example, an image RiPped for a class 2 marking engine may be of lower quality if it is transformed to a class 1 than if the CMYK had been initially ripped for engines of the class 1 marking engines and printed by a class 1 marking engine.

The method D includes generating one or more rendering tags in the DFE (at 58). In one embodiment, the rendering tags are used to benefit achieving overall high image quality. In this embodiment the rendering tags are emitted by the DFE. However, it should be understood that the rendering tags could also be generated in real time in the printer controller. Furthermore, the rendering tags could also be generated in real time in the system controller.

The method D further includes scheduling a page of a job on a marking engine N (at 60). This step 60 can be performed by a page scheduler (48 of FIGS. 2 and 3) which is responsible for planning/scheduling the pages of the jobs.

The method D also includes applying a set of transformations to the image data (at 62) that is to be printed on engine N. Generally, this step can be carried out in the individual printer module or in the tip controller as disclosed in FIGS. 2 and 3, respectively. The generation and saving of the transformations are described in further detail below with reference to FIG. 5.

Finally, the method D includes the step of printing the corrected image file on marking engine N. The corrected image file should be printed on the corresponding marking engine creating a document that satisfies one or more of the color specifications. While FIG. 4 shows a generic image file of page being generated, scheduled, corrected and printed before the next page is processed similarly, in actual practice many sheets are assigned to the various marking engines so that generation, scheduling, correction and printing are occurring simultaneously across the population of marking engines.

Figure 5:
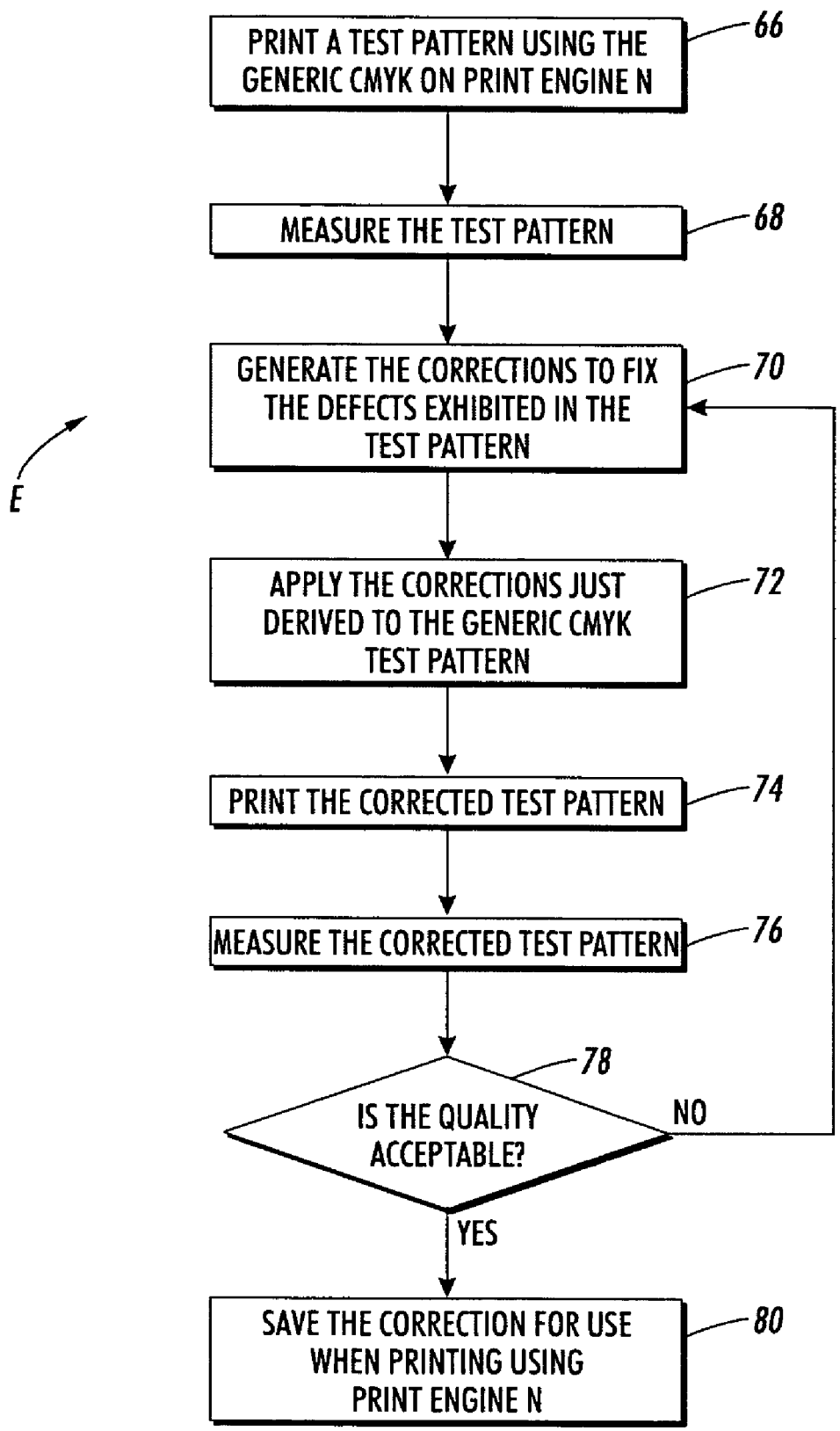
FIG. 5 is a flow chart illustration of the method generating corrections.

Now referring to FIG. 5, a method of generating a set of transformations is shown generally at E. This method may be implemented in the system controller, in the printer controller, or any other suitable network element.

The method E includes the step of measuring a test pattern (at 68 or at 76). As disclosed in FIGS. 2 and 3 the sensor (54 of FIGS. 2 and 3) can be used to measure a test pattern or patterns as generated by the individual marking engines. Test patterns are printed (at 66 for the initial generation of the corrections and at 74 for iterations) in order to provide data for generating the various corrections. The process shown in FIG. 5 is iterated as indicated by the loop from 78 to 70 until the desired level of correction is achieved.

The method continues with measuring the test patterns (at 66). These test patterns can be measured by a sensor (e. g. a linear sensor) within the confines of the marking engine or by an external sensor outside the confines of the marking engine. If the test patterns are measured and scanned using an external scanner, the external scanner can generate the corrections and send them to the system controller in order for the system controller to send the appropriate corrections to the printer controllers. In the alternative, an external scanner could simply send raw scanned data to the system controller for the system controller to process and generate the corrections and send to the appropriate printer controllers. There are a variety of other methods of measuring test patters which are known in the art. Whichever method is used, the results can be sent from the sensor image processing controller to either the IQ adjust controller and/or one of the printer controllers.

The method E continues with generating the corrections in order to fix the defects exhibited, for example in the variation or color over a page, in the test patterns (at 70). The correction process is explained in further detail in FIG. 6.

The method resumes with testing if the quality is acceptable. (at 78) If the image did not meet the specifications for color and page uniformity then the marking engine prints another test pattern or patterns (at 74) and another set of transformations are generated and are applied to the image data. High IQ and acceptable IQC are achieved and maintained by repeating the generation of the late-binding transformation and binding steps as required. The more often the testing occurs, the greater the chances of meeting minimal quality standards. If the quality is acceptable the corrections are saved for use when printing using marking engine N (at 80). These corrections can be repeated for any number of marking engines in the system. In one embodiment, each marking engine has a set of transformations for creating a print image file according to a color and page uniformity specification.

Figure 6:
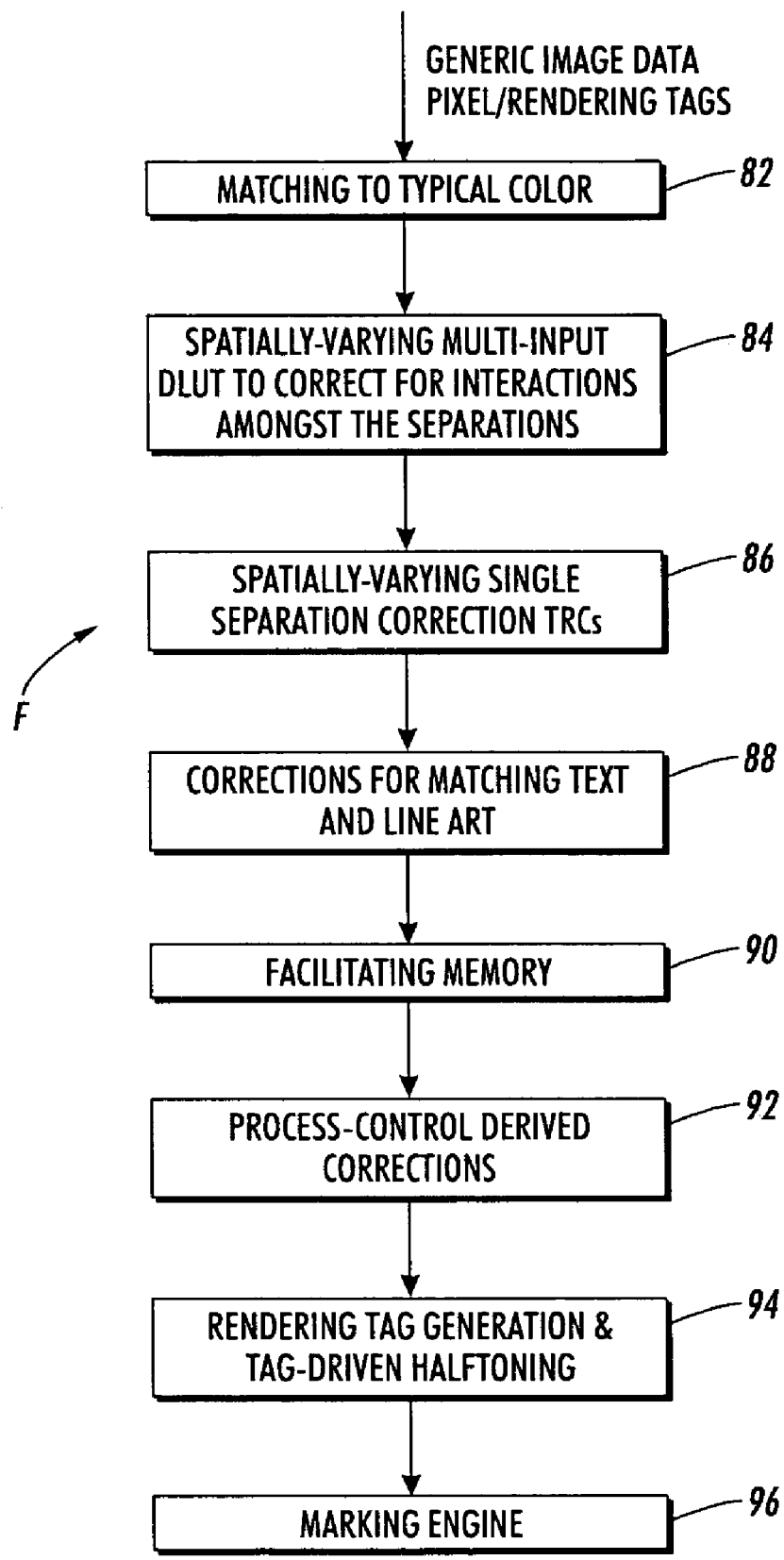
FIG. 6 is a flow chart illustration of the method of applying corrections.

Referring now to FIG. 6, a method of applying transformations F is disclosed. Some or all of these transformations can be applied in real time in order to account for the peculiarities of any given marking engine. The input to the processing indicated in F can be either contone data alone or contone data accompanied by pixel-type identification tags where the tags can be used wherever in the process F they are useful. Each IQ adjustment will be unique to the given marking engine in order to correct the typical color values of the individual marking engine(s) and the variations in uniformity that exist across the marking engine(s). Matching the typical color (at 82), accounting for variations in uniformity that involve interactions amongst the CMYK separations (at 84), correcting higher spatial frequency non-uniformities and non-uniformities that do not involve interactions amongst the CMYK transformations (at 86), corrections to match the quality of text and line art (at 88) and facilitating memory in order to account for the fact that the separations are printed at different times (at 86) are often conducted at the IQ adjust. Process-control derived modifications 92, tag generation and tag driven halftoning 94 are commonly conducted in the IQ adjust 38 or within the ME. Note that the tag generation (at 94) may be the only tags used or the tag generation (at 94) may make use of the pixel tags that can be input to F. However, it should be appreciated that application can vary.

Matching the typical color values of the multiple marking engines of a given class is disclosed (at 82). Typically matching the typical color is achieved by using multi-dimensional transforms. For example, if generic image data which comes from the DFE is given to each individual marking engine, the color output would not necessarily be exactly the same, i.e., sending same CMYK to the multiple engines would result in the printing of different color, for every individual marking engine. In order to correct this, a multidimensional transformation must be used. In order for the typical color values for each of the marking engines to be within a given specification, even if each individual marking engine is working properly, inconsistencies can still exist between the individual marking engines. These multidimensional transformations are used to correct these inconsistencies.

Accounting for variations in uniformities within a page is disclosed (at 84 and 84). Multidimensional look up tables are often used to account for variations in uniformities that involve interactions amongst the color separations. For example, if an individual marking engine is exhibiting variations in behavior from the back to the front of the printing process, then a multidimensional look up table would be used to correct for the variations in this marking engine, if the root cause of the difference in behavior front-to-back involved interactions amongst the color separations. This will correct the defects that may occur within any given page. For example, if one of the marking engines creates a lighter streak through the middle of the page, this transformation would correct that streak by creating an image that prints darker across the middle of that page.

Another aspect of IQ Adjustments is the use of one dimensional, i.e., only one input required to generate the correct output, spatially varying tone reproduction curves (TRCs) which is disclosed (at 86). In one embodiment, simple TRCs may correct for higher spatial frequency in non-uniformities. These TRCs can be used to adjust pixel values to compensate for the characteristics of an individual marking engine. For example, diagnostic or calibration image is rendered by a marking engine. An image includes portions that are meant to be rendered to have the same lightness or shades of gray. The lightness or shade of gray in the rendering image is measured by the sensor. The measurements can then be used to generate an engine response curve (ERC). The ERC may describe a response over the entire area of the diagnostic or calibration image. Additionally, ERCs can be used to generate a specific spatial location or range of locations in order to correct non-uniformities. These compensating TRCs are useful for compensating for rendered images of non-uniformities where image pixels describe input or colors or shades of gray with a relatively fine resolution. For example, compensating TRCs are useful where image pixels describe an input or desired color with one or more values in a relatively broad range. Such pixels are said to describe an input or desired color with contone values. In such systems one may select an appropriate compensating TRC for a pixel location and rendering image space on a contone value of the input pixel. Corrections (at 85) to match the behavior of the multiple marking engines when text and line art is being printed are also included. These corrections typically depend on the values of the pixels in a local neighborhood surrounding the pixel that is being corrected.

Facilitating, local memory (at 86) is another feature applying transformations, e.g., for use by the corrections that need context like those corrections (at 85) for matching text quality amongst the multiple marking engines. Local memory is also used to account for the fact the separations that are most likely imaged at different times. Memory can be in a variety of different forms including but not limited to disk storage, RAM, etc.

Another aspect of the applying transformations is process control derived modifications (at 92). Sensors are used which detect when the print engine has reached a control limit. One method of bringing the output back into specification is to apply a TRC to the image data before it is rendered for printing.

The method may also include implementing tag driven halftoning (at 89). In tag-driven halftoning, rendering tags accompany the image data and instruct the image path electronics on how best to convert the contone (multiple-bit-per-pixel information, typically 0-255) image data to what is actually printed by the print engine. For example, the print engine may have several different halftone screens that can be used for printing. The rendering tag could be used to select which halftone screen to use for any given pixel. The rendering tags feature can be useful because often time print engines that cannot develop in the analog fashion of photography are used. Note that rendering tags may also be generated locally to control the tag-driven halftoning. In some applications steps 92 and 94 occur inside the marking engine 96.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

We claim:

1. A multifunction printing system including marking engines of at least one class of marking engines, said printing system comprising:
    an image processor configured to emit generic image data for a page of a job independent of which of the multiple marking engines of multiple printers are used to print said page of the job;
    a storage component configured to store said generic image data where said generic image data may is routed to one or more said multiple marking engines;
    a scheduler configured to transmit said generic image data to at least one of said multiple marking engines;
    a scanner configured to test images resulting from said generic image data and each of said multiple of marking engines;
    a controller configured to process the scans of the test images so as to produce transformations comprising an image quality adjustment unique for each of said multiple engines which enable one or more said multiple engines in a class to print said generic image data and produce prints that conform to a desired color and page uniformity specifications within a predetermined tolerance and within a predetermined page uniformity metric; and,
    an image quality adjust processor for applying a transformation corresponding to a selected one of the marking engines to said generic image data in real time, enabling printing of said generic image data using any of said multiple marking engines so that the printed data conforms to the desired color and page uniformity specifications for the plurality of marking engines.

2. The multifunction printing system according to claim 1, wherein said scanner is an internal scanner located within the physical confines of said multifunction printing system.

3. The multifunction printing system according to claim 1 wherein said controller is a printer controller that transforms a CYMK value for a first class of marking engine to a CYMK value for a second class of marking engine.

4. The multifunction printing system according to claim 3, wherein said printer controller generates rendering tags.

5. The multifunction printing system according to claim 1, wherein said image processor is a digital front end.

6. The multifunction printing system according to claim 1, wherein said image processor compresses said input data and said input data is sent to said storage component.

7. The multifunction printing system according to claim 1, wherein said storage component is configured to store said compressed generic image data.

8. The multifunction printing system according to claim 7, further comprising a decompressor configured to decompress said compressed generic image data.

9. The multifunction printing system according to claim 7, further comprising a second storage component configured to store said decompressed generic image data.

* * * * *